Dec. 31, 1929.  M. C. BERSTED  1,741,911

AUTOMATICALLY CONTROLLED ELECTRIC CONNECTION PLUG

Filed Oct. 13, 1923  2 Sheets-Sheet 1

Inventor
MARTIN C. BERSTED.
By A. B. Bowman
Attorney

Dec. 31, 1929.  M. C. BERSTED  1,741,911
AUTOMATICALLY CONTROLLED ELECTRIC CONNECTION PLUG
Filed Oct. 13, 1923  2 Sheets-Sheet 2

Inventor
MARTIN C. BERSTED.
By A. B. Bowman
Attorney

Patented Dec. 31, 1929

1,741,911

UNITED STATES PATENT OFFICE

MARTIN C. BERSTED, OF SAN DIEGO, CALIFORNIA

AUTOMATICALLY-CONTROLLED ELECTRIC CONNECTION PLUG

Application filed October 13, 1923. Serial No. 668,317.

My invention relates to an automatic electric connection plug for controlling the electric current of electric heating apparatus, and the objects of my invention are: first, to provide a plug of this class which may be readily connected with any conventional electric outlet for automatically controlling the electric current to the electric apparatus with which it is connected; second, to provide a plug of this class which controls the electric current and the heat of the heating apparatus with which it is connected by reason of electric heating means within the plug; third, to provide an electric current and heat controlling means which may be readily and substantially synchronized with the heating means and heat of the heating apparatus; fourth, to provide a plug of this class in which the controlling and heating means thereof is enclosed in a heating chamber within the plug so that the temperature of heat generated by the plug will not be materially affected by outside conditions; fifth, to provide a plug of this class with heat regulating means which may be readily adjusted to fix the temperature of the heat of the heating apparatus to any point desired; sixth, to provide novel heat regulating means for a plug of this class; seventh, to provide a novelly constructed screw plug means for a plug of this class; eighth, to provide as a whole a novelly constructed, automatic, electric connection plug for controlling the electric current and heat of electric heating apparatus, and ninth, to provide a plug of this class which is very simple and economical of construction, durable, practical, efficient, reliable, and which will not readily deteriorate or get out of order.

Figure 1:
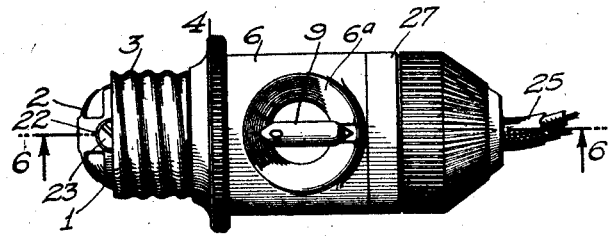
Figure 2:
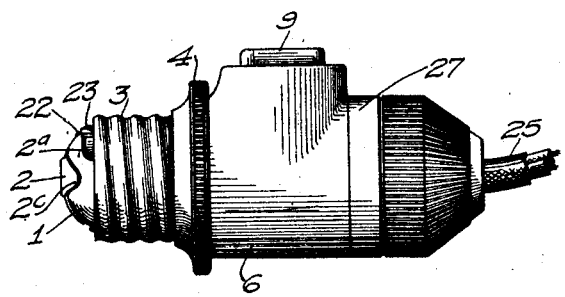
Figure 3:
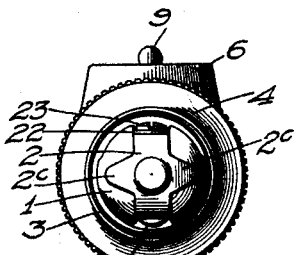
Figure 4:
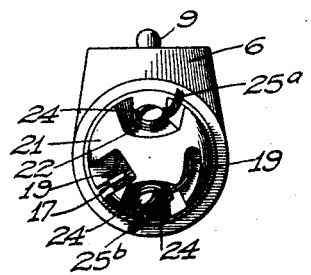
Figure 5:
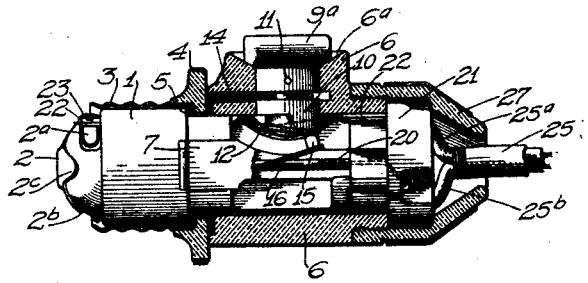
Figure 6:
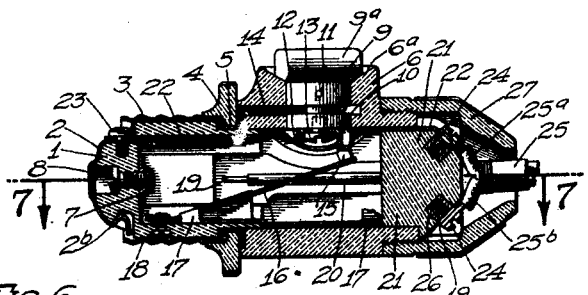
Figure 7:
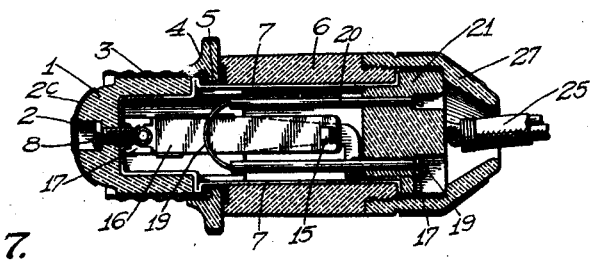
Figure 8:
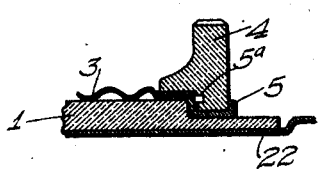
Figure 9:
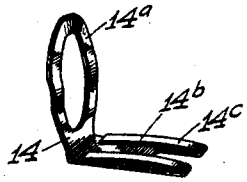
Figure 10:
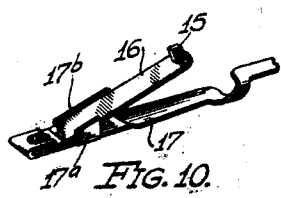

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side view of my automatic electric connection plug connected to one end of an electric cable; Fig. 2 is another side view thereof, taken at a right angle to that of Fig. 1; Fig. 3 is an end view of my plug, taken from the plug end thereof; Fig. 4 is a view taken from the other end thereof with the cap removed; Fig. 5 is another side view thereof with certain of the casing and other members broken away and in section to facilitate the illustration; Fig. 6 is a longitudinal sectional view thereof, taken through 6—6 of Fig. 1; Fig. 7 is another longitudinal sectional view thereof, taken through 7—7 of Fig. 6; Fig. 8 is an enlarged, detail view of the screw contact member at the plug end secured to an annular member for rotating the same; Fig. 9 is a detail, perspective view of the electric conducting member connecting the screw contact member with the contact member of the temperature adjusting member, and Fig. 10 is a detail, perspective view showing the mounting of the thermostat member.

Like characters of reference refer to similar parts and portions throughout the several views of the drawings.

The plug contact member support 1, plug contact members 2 and 3, annular member 4, screw contact member securing ring 5, casing member 6, casing retaining member 7, screw 8, heat regulating member 9, contact support 10, pin 11, contact member 12, screw 13, conductor 14, contact point 15, thermostat member 16, thermostat member support 17, screw 18, heating element 19, heating element supports 20, terminal support 21, conductor 22, screws 23 and 24, electric cable 25, bushings 26, and the cap 27, constitute the principal parts and portions of my automatic electric connection plug.

The plug contact member support 1 of my electric connection plug is made of insulating material and is provided, at the end adapted to be inserted into a socket of a conventional outlet, with a terminal or contact member 2. Said contact member is provided with a pair of opposed retaining portions 2ª at one end thereof, adapted to be positioned in oppositely disposed slots in the side of said support, and at the opposite end with a spring catch portion 2ᵇ, which is adapted to fit into a recess in the support 1, as shown best in Fig. 6. Said contact member is also provided with a pair of laterally extending portions 2ᶜ to more securely position said contact member on said support. Said support is also provided with an annular screw terminal or contact member 3, of conventional construction, which is secured at its inner end to an insulating, annular, rotating member 4 by means of an annular, contact securing member 5. It will be here noted that the screw contact member 3 is usually made of thin sheet metal and does not possess sufficient rigidity to rigidly secure the same to the annular member 4. I have, therefore, provided the annular member 5 of heavier construction, which is channel-shaped and is provided at its outer flange with a plurality of inwardly extending, pointed lugs 5ᵃ, which pierce an inwardly extending flange of the contact member 3 and extend into recesses in the annular member 4. The contact member 2 is connected by means of a conductor 22 extending the full length of the plug with the conductor 25ᵃ of the electric cable 25, said conductor 22 being secured to the contact member 2 by means of a screw 23. The annular screw contact member 3 is connected through the annular member 5 with the conductor 14 mounted in the casing member 6. The conductor 14 consists of an annular portion 14ᵃ which is provided with a plurality of offset portions, providing resilient engaging means with the annular member 5, and an inwardly projecting, bifurcated portion 14ᵇ, which extends into a recess in said casing member 6. The casing member 6 is secured to the support 1 by means of a casing retaining member 7, which is U-shaped, extending into the hollow portion of the support 1 and secured thereto by means of a screw 8. At the outer ends of the U-shaped retaining member 7 are provided outwardly extending lugs, which engage the opposite end of the casing member 6. In one side of the casing member 6 is revolubly mounted the regulating member 9 of insulating material, to the inner end of which is secured the contact support 10 by means of a pin 11. Said contact support 10 is provided with a reduced portion around which the bifurcated portion of the extended portion 14ᵇ of the conductor 14 extends. The portion 14ᵇ of the conductor 14 is provided with a pair of backwardly bent, resilient members 14ᶜ, which are adapted to frictionally engage said contact support 10 and conduct the current from the contact member 3 thereto. At the inner end of the contact support 10 is secured the helically shaped cam contact member 12, preferably of pure silver, by means of a screw 13. Said contact member 12 is adapted to engage the contact point 15, also preferably of pure silver, secured to the free end of the heat distortable, thermostat member 16. Said thermostat member is made of a pair of metallic plates of different coefficients of expansion secured together in any convenient manner. It will be here noted that the adjusting member 9 may be rotated in either direction by reason of a gradually inclined portion connecting the high and low portions of the helically shaped, contact member 12, as shown best in Fig. 5. The opposite end of the thermostat member 16 is loosely inserted into the one end of the thermostat member support 17, substantially as shown in Fig. 10, and secured within the inner portion of the support 1 by means of the screw 18. The thermostat member support 17 is provided with upwardly extending lugs 17ᵃ and 17ᵇ, which prevent lateral displacement of the thermostat member 16 when the contact member 12 is rotated. The support 17 extends backwardly within the casing member 6 and through the terminal support 21 at which end it is secured to one end of the heating element 19. The heating element 19, made of resistance wire, is bent in a U-shape and extends into the casing member 6 and into the hollow portion of the support 1, the leg portions of said heating element being positioned within and supported by the heating element supporting tubes 20, which are secured at one end in the terminal support 21. It will be noted that the tubes 20 support the heating element 19 as well as provide an electrical conductor to near the middle or U-portion of the heating element, thus confining the heat of the heating element to near the one end or U-portion thereof and at a point within the casing member 6 and the support 1 most desired. It will be here noted that the enclosure formed by the members 1, 6 and 21 provides a tight heating chamber, for the thermostat member, not materially affected by outside conditions. The other end of the heating element is connected with the other conductor 25ᵇ of the electric cable 25 by means of the screw 24. The terminal support 21 is preferably provided with threaded bushings 26, which provide better foundations for the screws 24 for securing the conductors 25ᵃ and 25ᵇ, respectively to the conductors 22 and the end of the heating element 19.

The handle portion 9ᵃ of the heat regulating member 9 is preferably flat and positioned substantially within a conically shaped recess 6ᵃ of the casing member 6, so that the adjusting member 9 cannot be readily shifted or turned by engagement with outside objects. On the conically shaped surface of the recess portion 6ᵃ are inscribed the letters, "L", "M" and "H", indicating respectively the "low", "medium" and "high" positions of the adjusting member for the different temperatures of heat.

It is obvious from this construction, as illustrated in the drawings and described in the foregoing specification, that there is provided an automatic electric connection plug for controlling the electric current and heat of electric heating apparatus substantially as set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. A means of the class described including a substantially cup-shaped end member, terminal members supported on said end member adapted to be inserted into and contact with the conventional terminals of an electric outlet, a casing member secured at its one end to said end member and extending axially therefrom, a second end member secured to the other end of said casing member, a thermostat member secured at its one end to the inner side of said first end member and extending at an angle to the axis of said casing lengthwise therein, a pair of parallel, spaced apart tubular conductor members extending from said second end member on either side of said thermostat, a heating wire extending through said tubular conductors in contact therewith and between the free ends thereof and straddling said thermostat member intermediate its ends, a contact point at the free end of said thermostat member, a contact member revolubly mounted in the side of said casing adjacent said contact point and adjustable relative thereto, and grip means on the outer side of said casing for rotating said adjustable contact member.

2. A plug of the class described, including a casing, a contact member mounted at one end thereof, an annular, screw, contact member mounted around said end, a thermostat member mounted at its one end within said casing and provided at its free end with a contact point, a temperature adjusting member revolubly mounted within said casing and provided at its inner end with a contact member adapted to engage the contact point of said thermostat member, the contact member of said adjusting member being connected with said annular, screw, contact member, and an electric heating element extending within and supported at the other end of said casing and positioned around and contiguous to said thermostat member.

3. A plug of the class described, including a casing, a contact member mounted at one end thereof, an annular, screw, contact member mounted around said end, a thermostat member mounted at its one end within said casing and provided at its free end with a contact point, a temperature adjusting member revolubly mounted within said casing and provided at its inner end with a contact member adapted to engage the contact point of said thermostat member, the contact member of said adjusting member being connected with said annular, screw, contact member, an electric heating element extending within and supported at the other end of said casing and positioned around and contiguous to said thermostat member, one end of said heating element being connected with said thermostat member, and an electric cable connected with the other end of said heating element and with said first mentioned contact member.

4. A plug of the class described, including a casing, a heat-distortable thermostat member mounted within said casing, a temperature adjusting member revolubly mounted within said casing and provided at its inner end with a helically shaped cam portion adapted to adjust said thermostat member, and contact portions in connection with said temperature adjusting member and said thermostat member, adapted to be connected with a source of electrical energy.

5. A plug of the class described, including a casing, a heat-distortable thermostat member mounted within said casing, a temperature adjusting member revolubly mounted within said casing and provided at its inner end with a helically shaped cam portion adapted to adjust said thermostat member, contact portions in connection with said temperature adjusting member and said thermostat member, adapted to be connected with a source of electrical energy, and an electric heating element positioned contiguous to said thermostat member, one end of which is connected with one of said contact members.

In testimony whereof, I have hereunto set my hand at San Diego, California, this 6th day of October, 1923.

MARTIN C. BERSTED.